(12) United States Patent
Ishida et al.

(10) Patent No.: US 10,780,859 B2
(45) Date of Patent: Sep. 22, 2020

(54) PASSENGER SEAT AIRBAG AND METHOD OF FOLDING THE SAME

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Shinichi Ishida, Kiyosu (JP); Takafumi Fukushima, Inazawa (JP); Wataru Miura, Kiyosu (JP); Hisamitsu Tatsunami, Toyota (JP); Kazuki Kusuhara, Kariya (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 16/137,913

(22) Filed: Sep. 21, 2018

(65) Prior Publication Data
US 2019/0092268 A1    Mar. 28, 2019

(30) Foreign Application Priority Data

Sep. 28, 2017   (JP) .................................. 2017-188199

(51) Int. Cl.
*B60R 21/237* (2006.01)
*B60R 21/205* (2011.01)
(Continued)

(52) U.S. Cl.
CPC .......... *B60R 21/237* (2013.01); *B60R 21/205* (2013.01); *B60R 21/233* (2013.01);
(Continued)

(58) Field of Classification Search
CPC .................... B60R 21/231; B60R 2021/23316
See application file for complete search history.

(56) References Cited

U.S. PATENT DOCUMENTS 6,073,961 A    6/2000 Bailey et al.
7,121,584 B2 * 10/2006 Hasebe ................. B60R 21/233
                                                 280/743.2
(Continued)

FOREIGN PATENT DOCUMENTS

EP    0679555 A1 * 11/1995 ........... B60R 21/231
EP    1298015 A2 *  4/2003 ......... B60R 21/2338
(Continued)

OTHER PUBLICATIONS

Office Action dated Sep. 18, 2019 issued in corresponding JP patent application No. 2017-188199 (and English translation).

*Primary Examiner* — Nicole T Verley
(74) *Attorney, Agent, or Firm* — Posz Law Group, PLC

(57) ABSTRACT

A passenger seat airbag includes a passenger side wall for catching a passenger, and a circumferential wall that extends forward from the passenger side wall in a converging fashion. The circumferential wall includes an upper wall, a lower wall, a left wall and a right wall, and can be mounted on a housing by the front end. An inlet port for introducing inflation gas is disposed at a front end region of the lower side wall, at a position displaced to the right from the center in a left and right direction of the passenger side wall. In the front end region of the circumferential wall, with respect to a substantial circumferential length which permits free expansion, a left circumferential wall region disposed on the left of the inlet port and a right circumferential wall region disposed on the right of the inlet port have equal substantial circumferential lengths.

6 Claims, 12 Drawing Sheets

(51) Int. Cl.
  *B60R 21/2338* (2011.01)
  *B60R 21/233* (2006.01)
  *B60R 21/2346* (2011.01)
  *B60R 21/16* (2006.01)

(52) U.S. Cl.
  CPC ...... *B60R 21/2338* (2013.01); *B60R 21/2346* (2013.01); *B60R 2021/161* (2013.01); *B60R 2021/23308* (2013.01); *B60R 2021/23316* (2013.01); *B60R 2021/23324* (2013.01); *B60R 2021/23382* (2013.01)

(56) References Cited

U.S. PATENT DOCUMENTS

| | | | |
|---|---|---|---|
| 7,914,038 B2* | 3/2011 | Koyama | B60R 21/205 |
| | | | 280/730.1 |
| 8,864,170 B2* | 10/2014 | Yamada | B60R 21/2338 |
| | | | 280/732 |
| 9,925,948 B2* | 3/2018 | Hotta | B60R 21/2338 |
| 10,214,174 B2* | 2/2019 | Zhang | B60R 21/2338 |
| 2009/0146404 A1* | 6/2009 | Furuno | B60R 21/231 |
| | | | 280/732 |
| 2015/0001836 A1* | 1/2015 | Yamada | B60R 21/231 |
| | | | 280/732 |
| 2016/0159311 A1* | 6/2016 | Yamada | B60R 21/233 |
| | | | 280/729 |

FOREIGN PATENT DOCUMENTS

| | | | | |
|---|---|---|---|---|
| JP | 3123388 B2 | | 1/2001 | |
| JP | 2002-503581 A | | 2/2002 | |
| JP | 2008013162 A | * | 1/2008 | |
| JP | 2008-195333 A | | 8/2008 | |
| JP | 4301160 B2 | * | 7/2009 | |
| JP | 2015-9674 A | | 1/2015 | |
| JP | 2016-107730 A | | 6/2016 | |
| JP | 2017065395 A | * | 4/2017 | |
| WO | WO-2018141616 A1 | * | 8/2018 | ........... B60R 21/205 |

* cited by examiner

PASSENGER SEAT AIRBAG AND METHOD OF FOLDING THE SAME

CROSS REFERENCE TO RELATED APPLICATIONS

The Present application claims priority from Japanese Patent Application No. 2017-188199 of Ishida et al., filed on Sep. 28, 2017, the entire disclosure of which is incorporated herein by reference.

BACKGROUND OF THE INVENTION

1. Field of the Invention

The present invention relates to a passenger seat airbag which is mountable on a vehicle and inflatable with an inflation gas. The invention also relates to a method of folding the airbag.

2. Description of Related Art

Generally, an airbag device for a passenger seat is mounted on an instrument panel of a vehicle which is disposed in front of the passenger seat, and includes an airbag, an inflator which feeds the airbag with an inflation gas, and a housing which stores the airbag and inflator. JP2015-9674 A, by way of example, discloses an airbag device for a passenger seat. An airbag employed in the airbag device is inflatable into a shape like a generally square pyramid the top of which is disposed at the front end. The airbag includes a passenger side wall which is deployed generally vertically at the rear end for catching a passenger sitting in the passenger seat, a circumferential wall which extends forward from the passenger side wall in a converging fashion and is adapted to be mounted on the housing by the front end region, and a gas inlet port which is disposed at the front end region of the circumferential wall for introducing an inflation gas from the inflator.

The inflator of the above airbag device is mounted on a position facing the passenger sitting in the passenger seat, and more particularly, on a portion of the instrument panel disposed in front of the passenger seat to be opposed to the center of the passenger. In such an instance, the gas inlet port is disposed at the center in a left and right direction of the airbag as fully inflated, such that the airbag is bilaterally symmetrical as viewed from the inflator. This configuration helps steady a deployment behavior of the airbag since the inflation gas is supplied to the left region and right region of the airbag equally in the event of an impact of the vehicle.

However, in recent years, the inflator is sometimes disposed a little to the right side (i.e. to an outboard side) with respect to the center of the passenger due to a large car navigation equipment or the like that is mounted on a top plane of the center in a vehicle-width direction of the instrument panel. Even in that case, it is still desirable that the center in a left and right direction of the passenger side wall of the airbag is in alignment with the center of the passenger. As a consequence, the center of the gas inlet port for receiving the inflator is displaced to the right side (i.e. to the outboard side) with respect to the center in the left and right direction of the passenger side wall.

In that case, the airbag as inflated will be bilaterally asymmetrical as viewed from the inflator, and more inflation gas will flow towards a side with a greater volume (i.e. towards the left side of the airbag), such that the airbag will lose balance in the left and right direction in the course of deployment, which will be likely to cause a torsion in the airbag and be destructive to the stability of deployment behavior of the airbag.

SUMMARY OF THE INVENTION

One object of the present invention is to provide a passenger seat airbag which is steady in deployment behavior despite of position misalignment between the center in a left and right direction of the gas inlet port and that of the passenger side wall. Another object of the invention is to provide a method of folding such an airbag.

The passenger seat airbag of the invention is adapted to be mounted on a housing disposed in an instrument panel in front of a passenger seat of a vehicle for rearward deployment. The airbag is inflatable with an inflation gas into a contour like a generally square pyramid, and includes:

a passenger side wall that is deployed generally vertically at a rear end of the airbag for catching a passenger sitting in the passenger seat;

a circumferential wall that extends forward from the passenger side wall in a converging fashion, the circumferential wall including an upper side wall, a lower side wall, a left side wall, a right side wall, and a front end region that is adapted to be mounted on the housing;

a gas inlet port for introducing the inflation gas, the gas inlet port being disposed at a front end region of the lower side wall, at a position displaced either to the left or right from a center in a left and right direction of the passenger side wall; and a left circumferential wall region and a right circumferential wall region that are disposed in the front end region of the circumferential wall and divided by a center line which runs through a center of the gas inlet port and extends towards the upper side wall.

With respect to a substantial circumferential length from the upper side wall to the center of the gas inlet port which permits free expansion, the left circumferential wall region and the right circumferential wall region have equal substantial circumferential lengths.

Although the gas inlet port is displaced in the left and right direction, the airbag of the invention is configured such that the left circumferential wall region and the right circumferential wall region, which are divided by the center line which runs through the center of the gas inlet port and extends towards the upper side wall, have equal substantial circumferential lengths. Despite the off-center arrangement of the gas inlet port, this configuration makes the root region of the airbag in a vicinity of the gas inlet port generally bilaterally symmetrical as viewed from the inflator as inserted into the gas inlet port, thereby reducing a difference between the amount of gas delivered towards the left and the amount of gas delivered towards the right out of the inflator in the event of an impact. As a consequence, the configuration of the invention will prevent a torsion from occurring at the root region of the airbag, and steady the deployment behavior of the airbag.

In the passenger seat airbag of the invention, in order that the left circumferential wall region and the right circumferential wall region have equal substantial circumferential lengths for permitting free expansion in the front end region of the circumferential wall, it is desired to form a tuck in either one of the left circumferential wall region and the right circumferential wall region having a longer circumferential length. The tuck can be formed by tucking and sewing up a portion of the circumferential wall, and reduces the longer circumferential length.

Although a passenger seat airbag generally has a bilaterally symmetrical contour with respect to the center in a left and right direction of the passenger side wall, in such an airbag that the gas inlet port is displaced either to left or right with respect to the center in the left and right direction of the passenger side wall, either one of left circumferential wall region or right circumferential wall region with respect to the center of the gas inlet port has a longer circumferential length than the other. However, with the tuck formed in either one of the left circumferential wall region and the right circumferential wall region having the longer circumferential length, the substantial circumferential lengths will be equalized between the left circumferential wall region and the right circumferential wall region. Other means for adjusting the circumferential length of the circumferential wall may include changing the shape of base cloths of the circumferential wall. However, forming the tuck on the circumferential wall can change the substantial circumferential length easily by changing the position of the seam of the tuck, without changing the shape of the base cloths of the circumferential wall.

The tuck may be formed at any position in a circumferential direction either on the left circumferential wall region or on the right circumferential wall region having the longer circumferential length. However, the tuck is desirably formed at a turn-round portion of the upper side all and lower side wall of the circumferential wall that is formed by bringing edges of the lower side wall and upper side wall into contact with each other. This way the tuck is formed easily in a production process of the airbag.

The length in a front and rear direction of the tuck may be determined as appropriate. However, the tuck is desirably so configured that a part thereof overlaps the gas inlet port in a projection in a left and right direction.

The method of folding the passenger seat airbag of the invention includes:

a preparatory folding step that unfolds and flattens the passenger side wall towards the gas inlet port and forms a preparatorily folded airbag;

a left-right contraction step that reduces a width in a left and right direction of the preparatorily folded airbag for storage in the housing; and a front-rear contraction step that reduces a width in a front and rear direction of the preparatorily folded airbag for storage in the housing.

In the left-right contraction step, a first region of the preparatorily folded airbag, which is disposed on one side of the gas inlet port in a left and right direction and has a longer circumferential length in the left and right direction, is folded in such a folding manner that unfolds easily, and a second region of the preparatorily folded airbag, which is disposed on the other side of the gas inlet port in the left and right direction and has a shorter circumferential length in the left and right direction than the first region, is folded in such a folding manner that unfolds less easily than that of the first region.

When the gas inlet port is disposed off-center in the left and right direction of the airbag, the circumferential length in the left and right direction will be different on the left side and right side of the gas inlet port, which will make it likely that the second region of the airbag with the shorter circumferential length (i.e. with a smaller expansion volume) completes inflation prior to the first region with the greater circumferential length (i.e. with a greater expansion volume). However, if, in the left-right contraction step, the first region is folded in such a folding manner that unfolds easily while the second region is folded in such a folding manner that unfolds less easily, the first and second regions (i.e. left and right regions) will be unfolded equally.

In order to differentiate the degrees of ease of unfolding between the first region and second region (i.e. between the left region and right region), it is also conceivable to fold the first region having the longer circumferential length in a bellows fashion while roll-fold the second region having the shorter circumferential length. However, with this way, it will be difficult to deploy the first and second regions equally because the bellows-folded region will unfold far more easily than the roll-folded region. Accordingly, in order to deploy the airbag with a balance between the first and second regions (i.e. left and right regions), it is desirable to roll-fold both of the first region and second region, while making the folding width of the second region smaller than that of the first region, and increasing the number of times of the roll-folding of the second region more than that of the first region.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
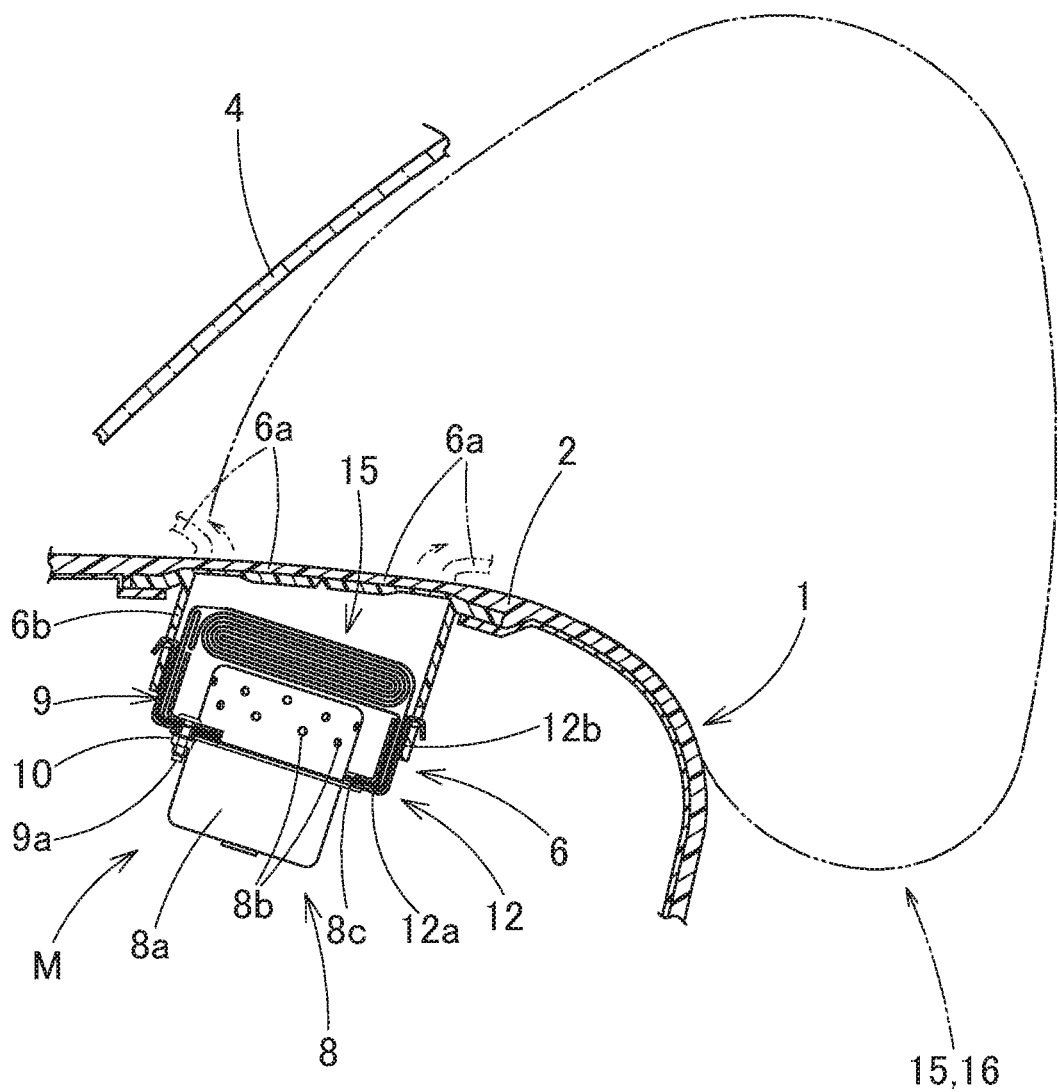
FIG. 1 is a schematic vertical sectional view of an airbag device for a front passenger seat as mounted on a vehicle, the airbag device employing an airbag which embodies the invention.

As shown in FIG. 1, a passenger seat airbag 15 embodying the invention is employed in an airbag device M for a front passenger seat, which is a top-mount airbag device disposed inside the top plane 2 of an instrument panel or dashboard 1 of a vehicle. Unless otherwise specified, front-rear, up-down, and left-right directions in this specification are intended to refer to front-rear, up-down, and left-right directions of the vehicle.

As shown in FIG. 1, the airbag device M includes a passenger seat airbag 15, which is folded up, an inflator 8 for supplying the airbag 15 with an inflation gas, a case (i.e., a housing) 12 for housing and holding the airbag 15 and inflator 8, a retainer 9 for mounting the airbag 15 and inflator 8 on the case 12, and an airbag cover 6 for covering the airbag 15.

The airbag cover 6 is integral with the dashboard 1 made from synthetic resin and includes two doors, i.e. front and rear doors, 6a designed to open when pushed by the airbag 15 upon airbag deployment. The airbag cover 6 further includes, around the doors 6a, a joint wall 6b which protrudes downwardly and is coupled to the case 12.

As shown in FIG. 1, the inflator 8 includes a body 8a, which has a generally pot-like shape and is provided with a plurality of gas discharge ports 8b, and a flange 8c for attachment to the case 12.

The case (i.e. housing) 12 is made of sheet metal into a generally rectangular parallelepiped, and has a rectangular opening on top. The case 12 includes a bottom wall 12a of a generally rectangular plate shape and a circumferential wall 12b extending upward from the outer edge of the bottom wall 12a. The inflator 8 is set in from the lower side of the bottom wall 12a and attached thereto. The circumferential wall 12b is coupled with the joint wall 6b of the airbag cover 6.

In the illustrated embodiment, the airbag 15 and the inflator 8 are secured to the case 12 with the aid of the retainer 9, which is located inside the airbag 15. Bolts 9a of the retainer 9 are put through a peripheral area of a later-described gas inlet port 20 of the airbag 15, the bottom wall 12a of the case 12 and the flange 8c of the inflator 8, and then fastened with nuts 10. Thus the airbag 15 and the inflator 8 are secured to the case 12. The bottom wall 12a of the case 12 is also provided with a bracket (not shown) to be jointed to the vehicle body structure.

Figure 12:
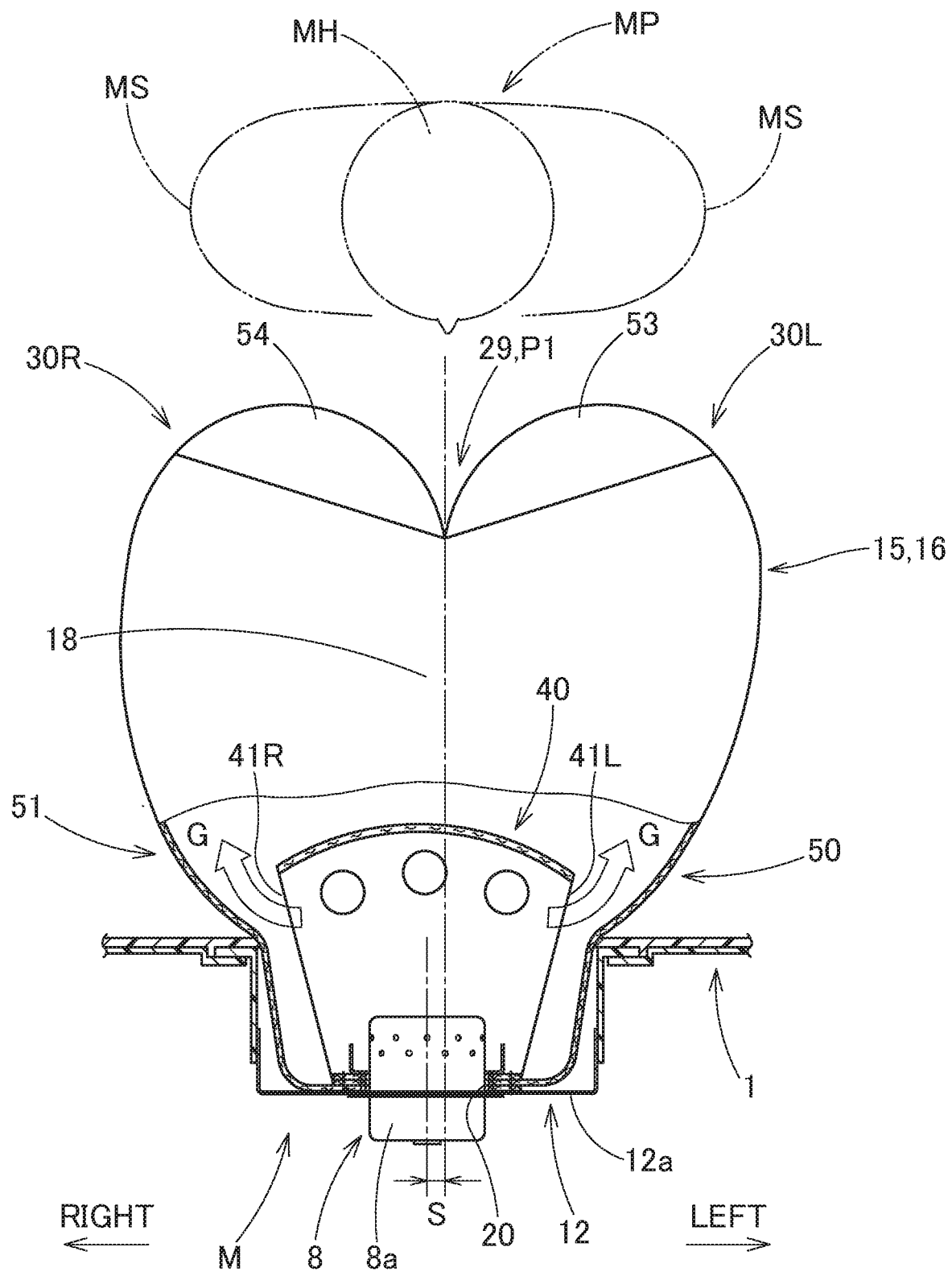
FIG. 12 is a schematic horizontal sectional view of the airbag device for a passenger seat taken along the front and rear direction, showing the airbag as deployed.

In the illustrated embodiment, as shown in FIG. 12, the case 12 of the airbag device M is adapted to be mounted on board (i.e. disposed inside the dashboard 1) such that the center of the inflator body 8a as fixed to the case 12 is displaced to an outboard side (to the right side) from the center of a passenger MP sitting opposite. The gap (misalignment amount) S between the centers of the inflator body 8a and passenger MP is 20 mm, in the illustrated embodiment.

Figure 2:
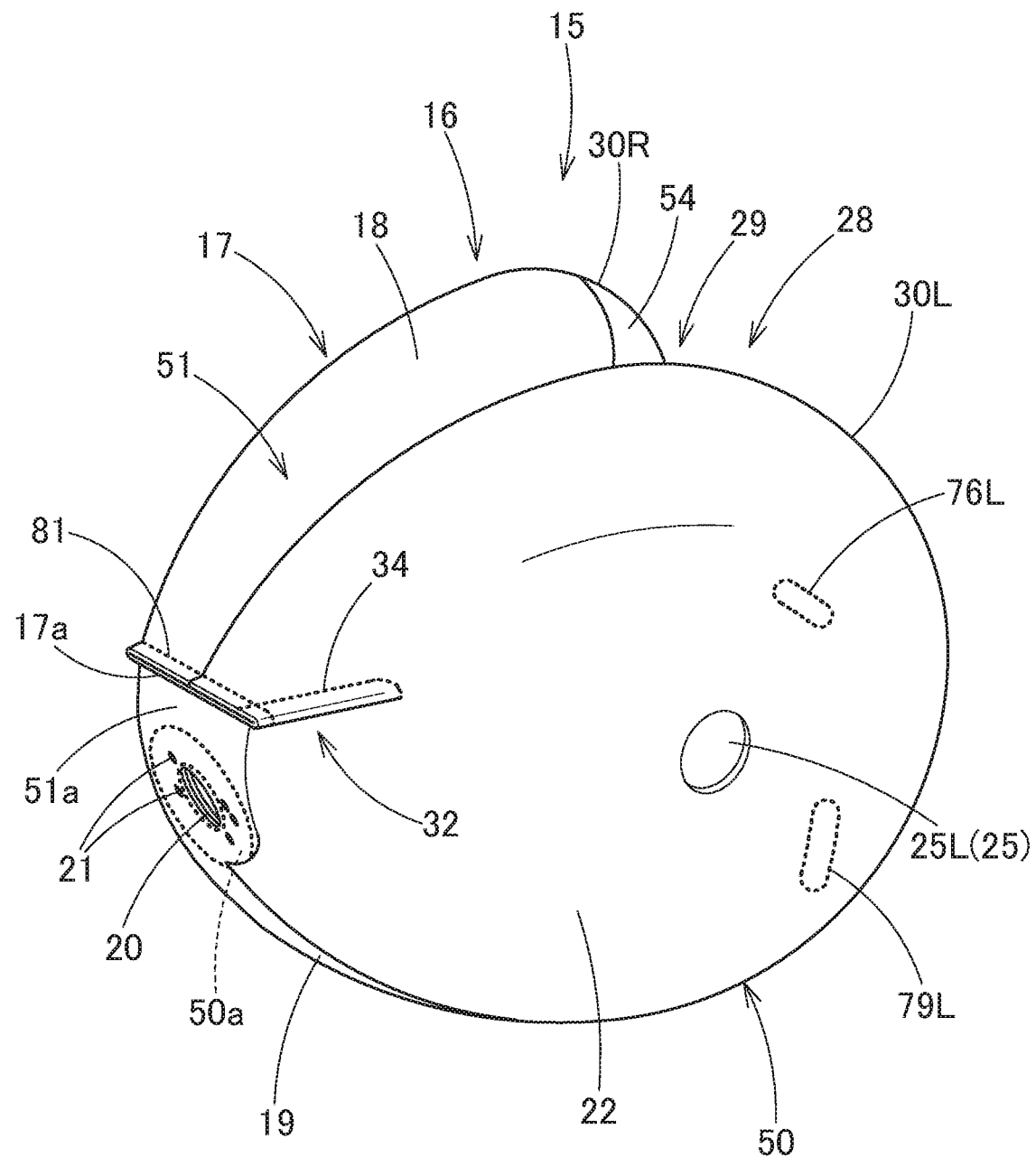
FIG. 2 is a perspective view of the airbag of the embodiment as inflated by itself.
Figure 3:
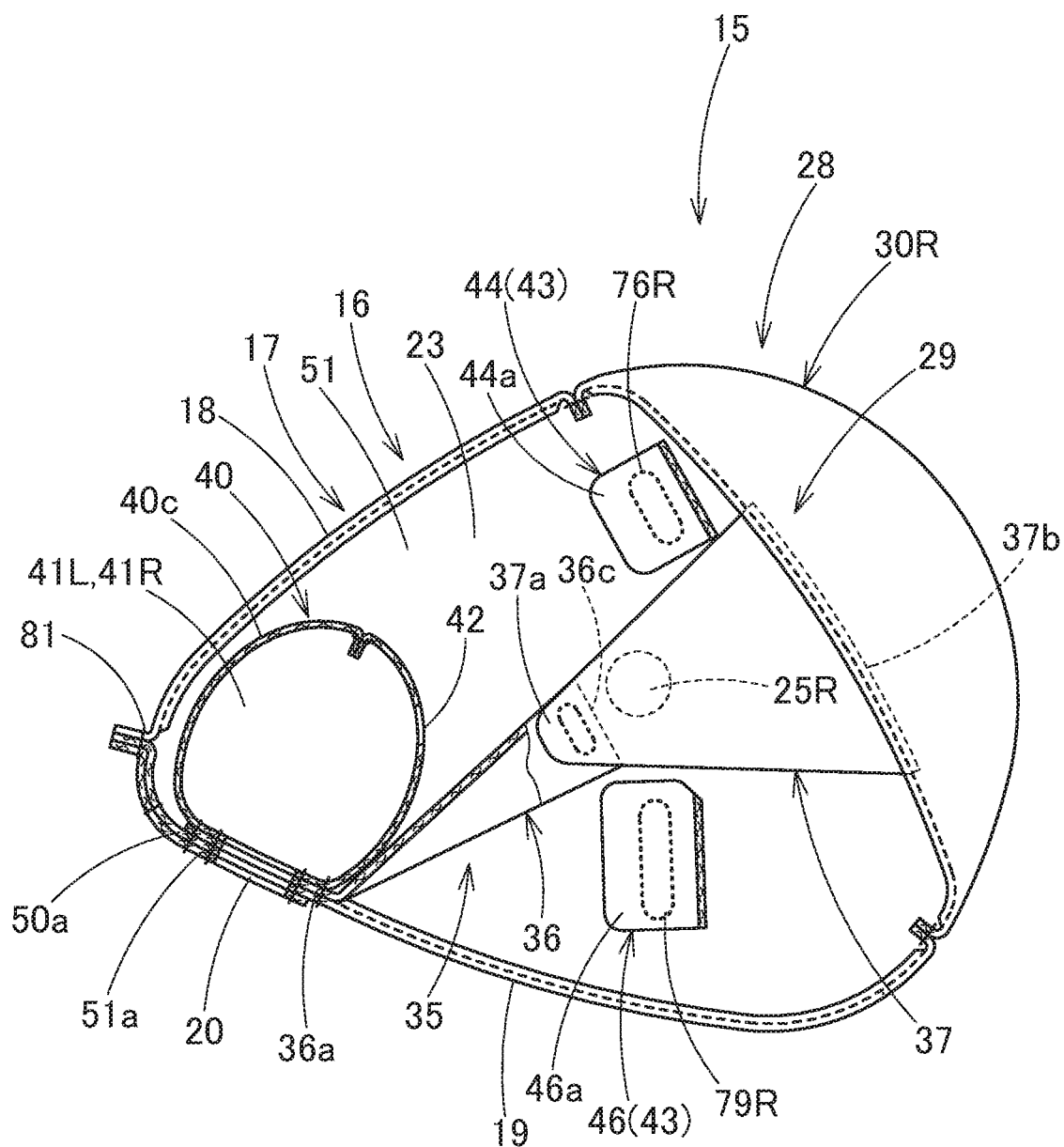
FIG. 3 is a schematic vertical sectional view of the airbag of FIG. 2 taken along a front and rear direction.
Figure 4:
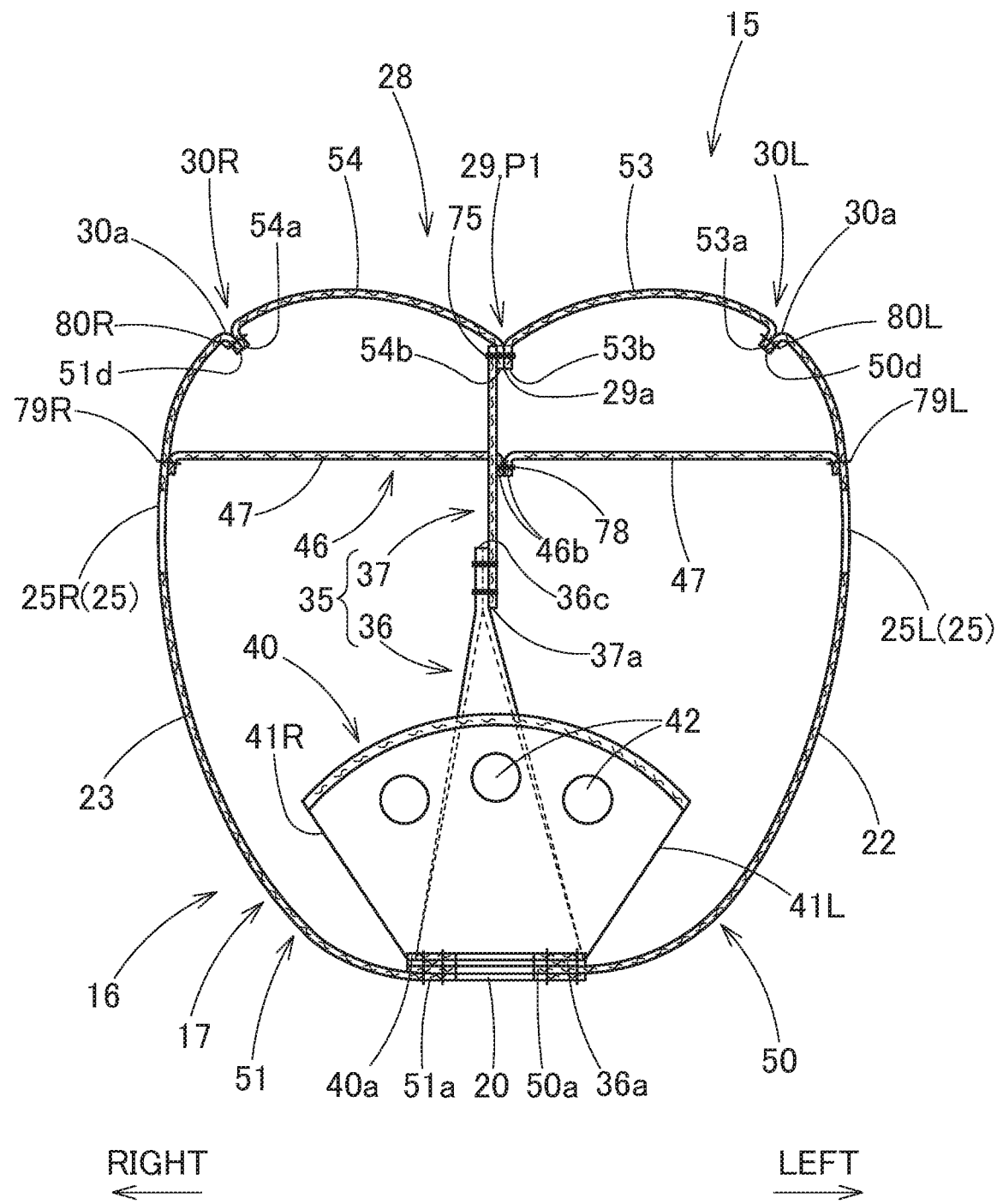
FIG. 4 is a schematic horizontal sectional view of the airbag of FIG. 2 taken along a front and rear direction.

Referring to FIGS. 2 to 4, the airbag 15 includes a bag body 16 which is inflatable with an inflation gas G, a front-rear tether 35 and a transverse tether 43 each of which is disposed inside the bag body 16 for controlling the shape of the bag body 16 as inflated, and a redirecting cloth 40 which redirects the inflation gas G towards the left and right.

As indicated with double-dotted lines in FIG. 1, the bag body 16 of the illustrated embodiment is designed to inflate into such a shape that fills up a space between the top plane 2 of the dashboard 1 and the windshield 4 disposed above the dashboard 1. More specifically, the bag body 16 as fully inflated includes a passenger side wall 28 which is deployed generally vertically at the rear end and a circumferential wall 17 which extends forward in a converging fashion from the passenger side wall 28. The bag body 16 is designed to be inflated, as a whole, into a generally bilaterally symmetric, square pyramid whose top is at the front end of the circumferential wall 17. The bag body 16 is mounted on the case (i.e. housing) 12 by the front end region.

The circumferential wall 17 is so deployable as to fill up a space between the top plane 2 of the dashboard 1 and the windshield 4, and includes an upper side wall 18 and a lower side wall 19 which extend generally along a left and right direction so as to be opposite to each other in an up and down direction, and a left side wall 22 and a right side wall 23 which extend generally along a front and rear direction so as to be opposite to each other in a left and right direction. A generally round gas inlet port 20 is formed proximate to the front end of the lower side wall 19 of the circumferential wall 17 for receiving the inflator body 8a to introduce an inflation gas. The peripheral region of the gas inlet port 20 is provided with a plurality of (four, in this embodiment) mounting holes 21 for receiving the bolts 9a of the retainer 9 such that the peripheral region of the gas inlet port 20 is mounted on the bottom wall 12a of the case 12.

Figure 6A:
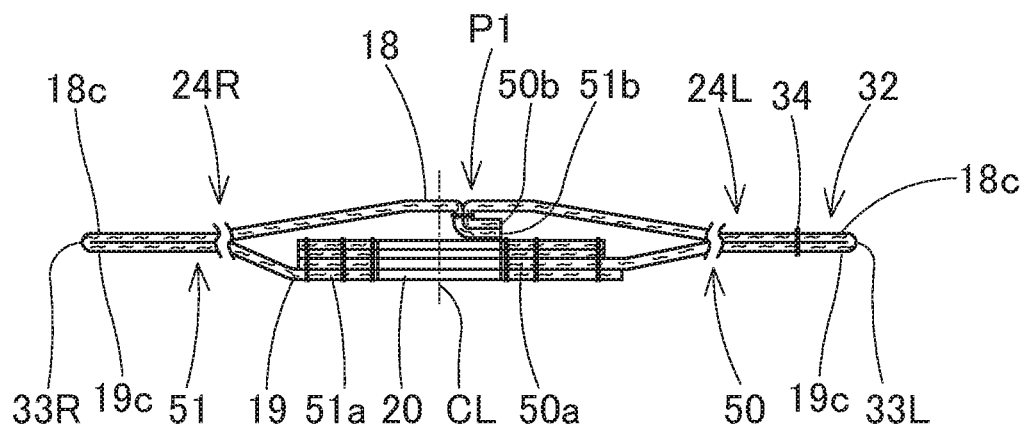
FIG. 6A is a schematic sectional view take along line VI-VI of FIG. 5, in the airbag in which the upper side wall and lower side wall are brought close to each other.
Figure 6B:
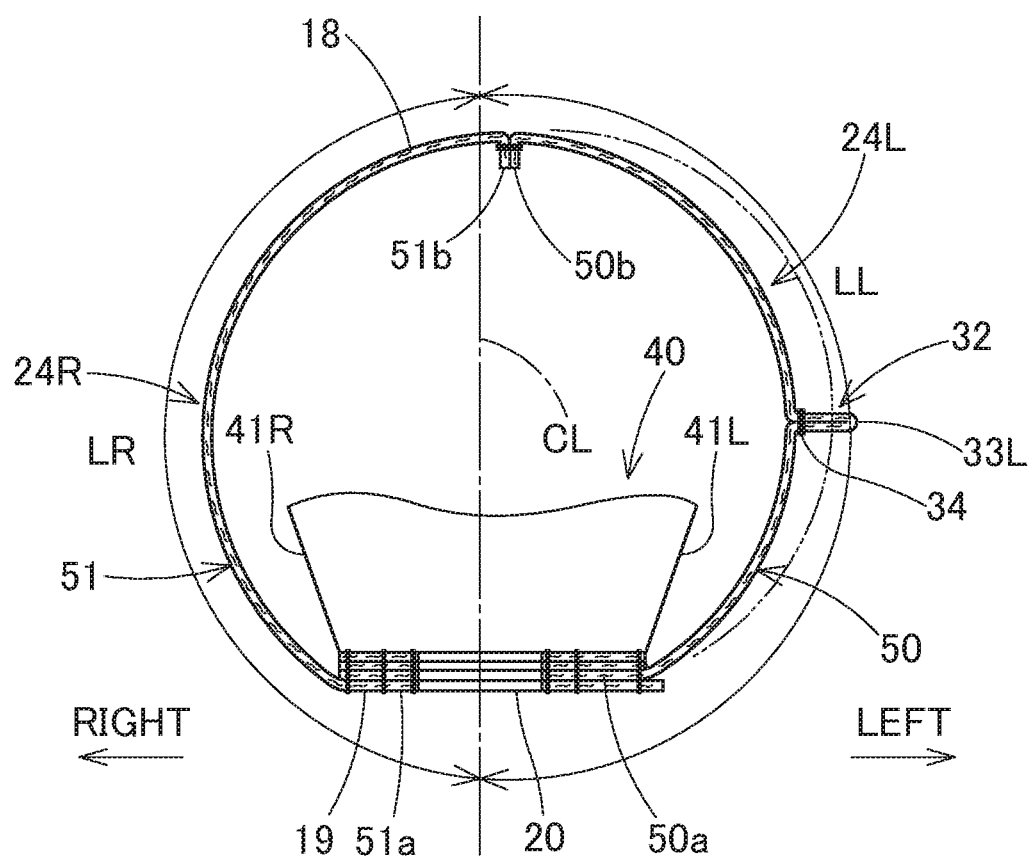
FIG. 6B is a schematic sectional view take along line VI-VI of FIG. 5, in the airbag in which the upper side wall and lower side wall are separated from each other.
Figure 7:
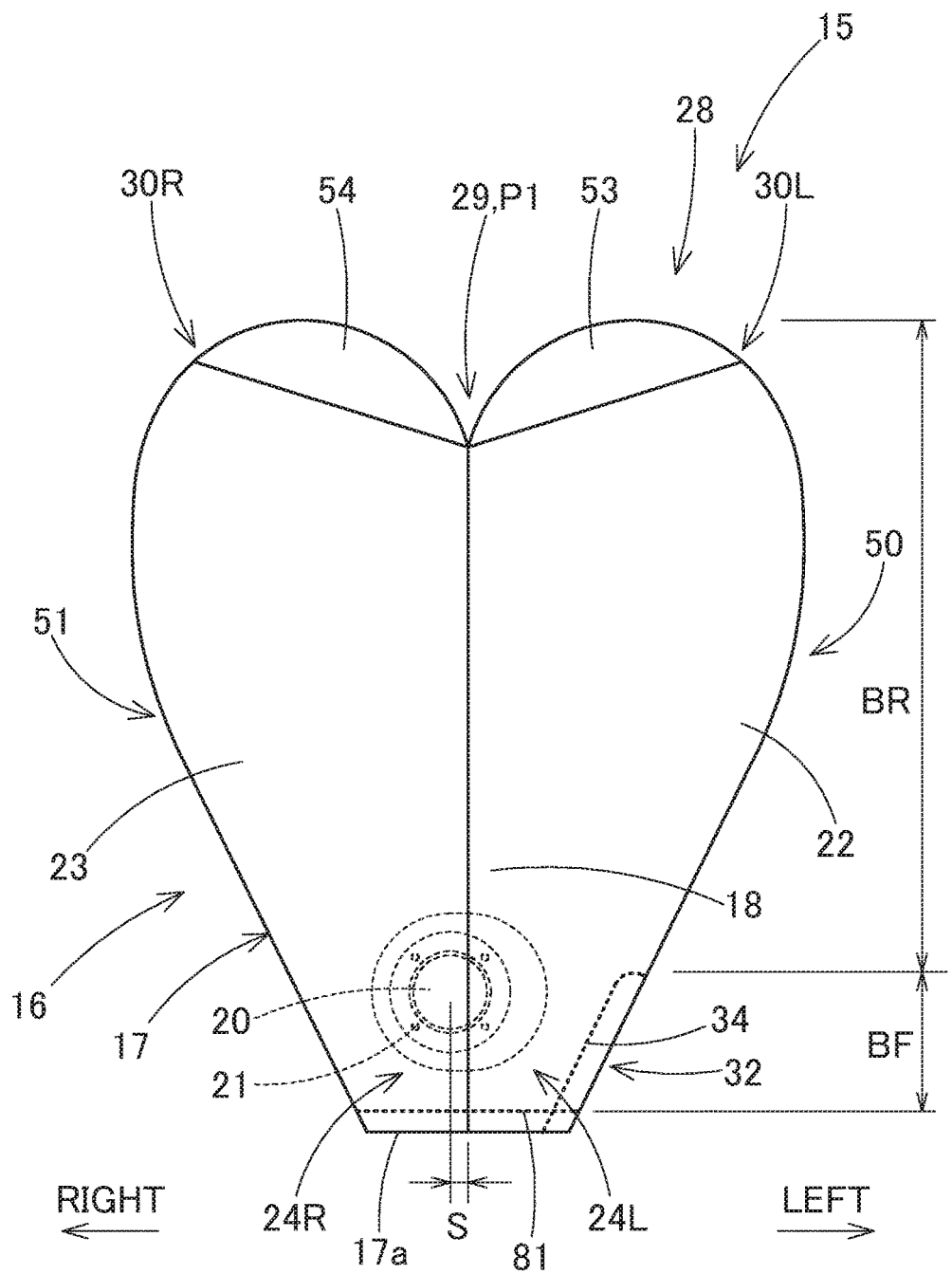
FIG. 7 is a plan view of the airbag of FIG. 2.

Correspondingly to the position of the inflator body 8a, the gas inlet port 20 is formed at a position displaced to the right (i.e. to an outboard side) from the center P1 in a left and right direction of the passenger side wall 28 as deployed by the gap S, as shown in FIG. 7. Here, as best shown in FIG. 2, the bag body 16 is provided with a tuck 32 in the front end region of the circumferential wall 17 where the gas inlet port 20 is disposed. As shown in FIGS. 6A and 6B, the front end region of the circumferential wall 17 is divided into a left circumferential wall region 24L and a right circumferential wall region 24R which are disposed on the left and right of the center of the gas inlet port 20, more particularly, which are divided by a center line CL that runs through the center of the gas inlet port 20 and extends upward towards the upper side wall 18. Without the tuck 32, the left circumferential wall region 24L would have a longer circumferential length, i.e. length from the upper side wall 18 to the center of the gas inlet port 20, than the right circumferential wall region 24R. That is, the tuck 32 reduces the circumferential length of the left circumferential region 24L such that a substantial circumferential length LL of the left circumferential region 24L which will permit free expansion, equals to a circumferential length LR of the right circumferential region 24R.

Figure 5:
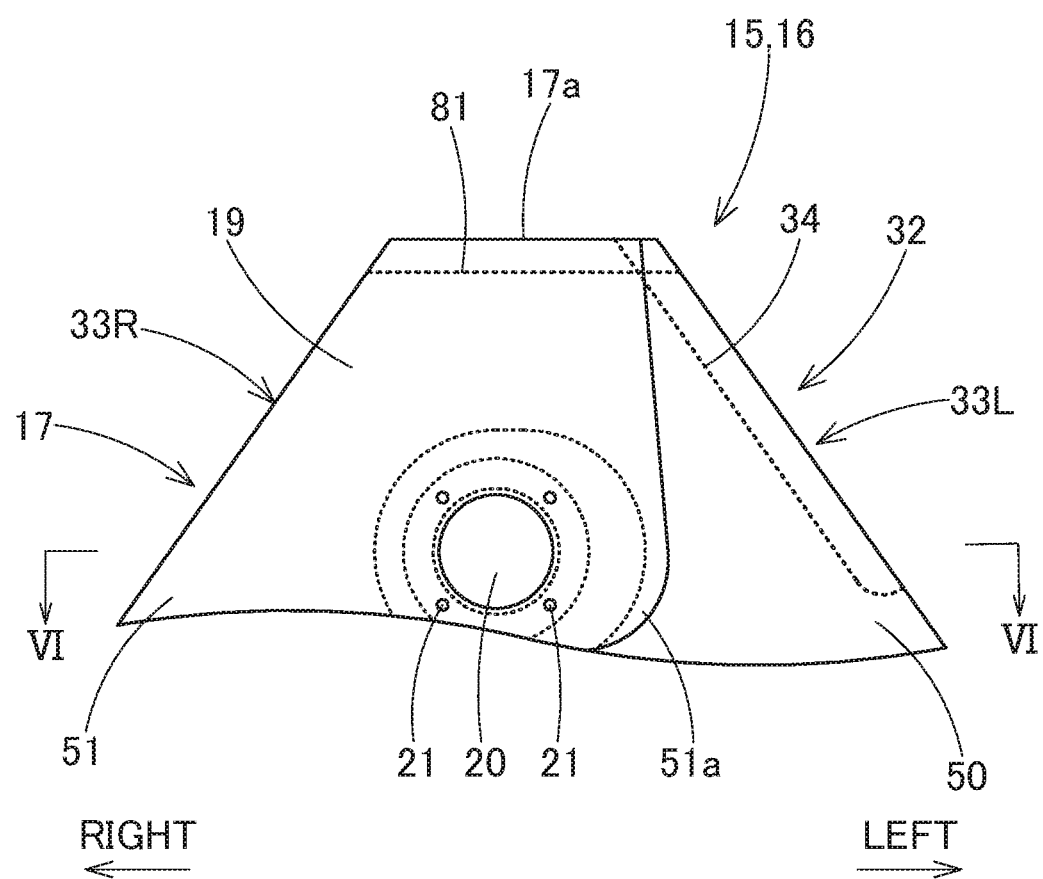
FIG. 5 is an enlarged view of a front end region of the airbag as laid flat such that an upper side wall and a lower side wall lie over each other.

As shown in FIGS. 5 and 6A, the tuck 32 is formed by bringing edges 19c and 18c of the lower side wall 19 and upper side wall 18 into contact with each other to form a fold or a turn-round portion 33L by the gas inlet port 20, and sewing the walls 18 and 19 together with a seam 34 formed at a distance of a predetermined width from the outer rim of the fold 33L. As shown in FIG. 5, the seam 34 forming the tuck 32 extends straightly and continuously from the front end 17a towards the rear end of the circumferential wall 17, along the outer rim of the turn-round portion 33L, such that the tuck 32 has such a length that overlaps the gas inlet port 20 by a part (by the rear end region) in the projection in the left and right direction. As a consequence, the circumferential wall 17 has equal circumferential lengths between the left region and the right region with respect to the center P1 in the left and right direction of the passenger side wall 28 in the rear region of the airbag 15 (i.e. in a region BR indicated in FIG. 7), and has equal substantial circumferential lengths between the left region and the right region with respect to the center of the gas inlet port 20 in the front region of the airbag 15 (i.e. in a region BF in FIG. 7) as well.

As can be seen in FIGS. 3 and 4, the redirecting cloth 40 is disposed over the gas inlet port 20 inside the bag body 16. The redirecting cloth 40 is formed into a generally tube open at the left and right ends for redirecting an inflation gas as fed via the inlet port 20 towards the left and right. That is, the inflation gas flows out of the left and right openings 41L and 41R of the redirecting cloth 40 into the bag body 16. The redirecting cloth 40 is so designed that an upper area of each of the left and right openings 41L and 41R is disposed above the top plane 2 of the dashboard 1 at airbag deployment. Further, the redirecting cloth 40 is provided, on the circumferential wall 40c, with a plurality of through holes 42 for releasing an inflation gas G having been fed via the gas inlet port 20. Each of the through holes 42 is smaller than each of the left and right openings 41L and 41R. The through holes 42 help steady the shape of the redirecting cloth 40 and the outflow direction of the inflation gas G into the bag body 16 at airbag deployment by releasing a small amount out of inflation gas G.

As can be seen in FIG. 4, the redirecting cloth 40 includes, in the joint region 40a to the bag body 16, openings (reference numeral omitted) corresponding to the gas inlet port 20 and the mounting holes 21. The redirecting cloth 40 is sewn to the lower side wall 19 by the joint region 40a, at an entire periphery of the gas inlet port 20.

The circumferential wall 17 further includes, in each of the left side wall 22 and right side wall 23 which are opposed to each other at airbag deployment, a generally round vent hole 25 (25L, 25R) that releases an extra inflation gas.

The passenger side wall 28 is a portion of the airbag 15 for catching a front-seat passenger MP, and is configured to be deployed generally vertically at the rear end of the bag body 16 in such a manner as to face the passenger MP. In the illustrated embodiment, the passenger side wall 28 as inflated includes a recessed area 29 that is sunken forward and extends generally vertically generally at the center P1 in the left and right direction, as shown in FIGS. 2 to 4. The recessed area 29 is formed over a generally entire area in an up and down direction of the passenger side wall 28. On the left and right sides of the recessed area 29 are raised regions 30 (30L and 30R) that protrude rearward relative to the recessed area 29. That is, at full deployment, the recessed area 29, which is sunken at the center in the left and right direction, and the raised regions 30L and 30R, which are disposed on the left and right sides of the recessed area 29, extend continuously along the up and down direction of the passenger side wall 28 of the bag body 16 (FIGS. 3 and 4). This unevenness created by the recessed area 29 and raised regions 30L and 30R is generally uniform in the passenger side wall 28, and converges forward on the upper side wall 18 and lower side wall 19 of the circumferential wall 17. In the bag body 16 of the illustrated embodiment, as shown in FIG. 4, the leading end (bottom) of the recessed area 29 is composed of a seam 75 that sews (joins) together inner circumferential edges 53b and 54b of a later-described inner left panel 53 and an inner right panel 54 for forming the passenger side wall 28 whereas the tops 30a of the raised regions 30L and 30R are composed of seams 80L and 80R that respectively sew (join) together each of rear edges 50d and 51d of later-described outer left panel 50 and outer right panel 51 and each of outer circumferential edges 53a and 54a of the inner left panel 53 and inner right panel 54.

The front-rear tether 35 is disposed inside the bag body 16 for regulating an inflated contour of the bag body 16. The front tether 35 connects a vicinity of the gas inlet port 20 and passenger side wall 28 and is deployable generally along a front and rear direction. The front-rear tether 35 of the illustrated embodiment is formed by joining together a front section 36 extending from the vicinity of the gas inlet port 20 and a rear section 37 extending from the passenger side wall 28.

The front section 36 is formed into a bilaterally symmetrical contour with respect to the gas inlet port 20. As shown in FIGS. 3 and 4, at airbag deployment, it takes such a three-dimensional shape approximate to a triangular pyramid that the front end region extends generally along a left and right direction whereas the rear end region extends generally along an up and down direction. The front end region of the front section 36 serves as a joint region 36a to the bag body 16, and is provided with openings (reference numeral omitted) corresponding to the gas inlet port 20 and the mounting holes 21. The join region 36a is sewn to the lower side wall 19 by an entire periphery of the gas inlet port 20 (FIGS. 3 and 4). The rear end region of the front section 36 extending rearward from the gas inlet port 20 forms a three-dimensional shape approximate to a triangular pyramid (FIGS. 3 and 4). The rear end 36c of the front section 36 to be sewn to the front end 37a region of the rear section 37 is generally identical in width in an up and down direction to the front end 37a region of the rear section 37.

The rear section 37 is generally trapezoidal in plan view. The rear end 37b region, which is greater in width, of the rear section 37 is jointed to the inner circumferential edges 53b and 54b of the later-described inner left panel 53 and inner right panel 54, and the front end 37a having a smaller width is sewn to the front section 36.

The front-rear tether 35 regulates a clearance between the periphery of the gas inlet port 20 and a central region in the left and right direction of the passenger side wall 28 (i.e. the recessed area 29) at airbag deployment, in order to prevent the leading end 29a of the recesses area 29 from protruding rearward or towards the passenger MP too much in an initial stage of airbag deployment and to keep the recessed area 29 recessed at full airbag deployment.

The transverse tether 43 connects the left side wall 22 and right side wall 23 of the bag body 16 and is deployable generally along a left and right direction. In the illustrated embodiment, as shown in FIG. 3, the transverse tether 43 includes an upper transverse tether 44 which is deployable above the front-rear tether 35 and a lower transverse tether 46 which is deployable below the front-rear tether 35. Each of the transverse tethers 44 and 46 is formed into a band deployable generally horizontally. As shown in FIG. 4, the lower transverse tether 46 is formed by sewing (joining) together ends of two left and right base cloths 47 each of which is a flexible sheet material. Likewise, the upper transverse tether 44 is composed of two base cloths although not illustrated in the drawings. It will be understood that each of the transverse tethers does not necessarily have to be composed of two base cloths, but may be composed of a piece of band-shaped base cloth.

Since the passenger side wall 28 of the bag body 16 of the illustrated embodiment includes the recessed region 29 which is sunken at the center in the left and right direction and the raised regions 30L and 30R that protrude rearward relative to the recessed area 29 on the left and right of the recessed area 29, when the passenger side wall 28 of the bag body 16 configured as described above catches a passenger MP, it firstly cushions the shoulders MS of the passenger MP with the raised regions 30L and 30R, then receives the head MH in the recessed area 29 while holding the shoulders MS by the raised regions 30L and 30R, as shown in FIGS. 4 and 12.

Figure 8:
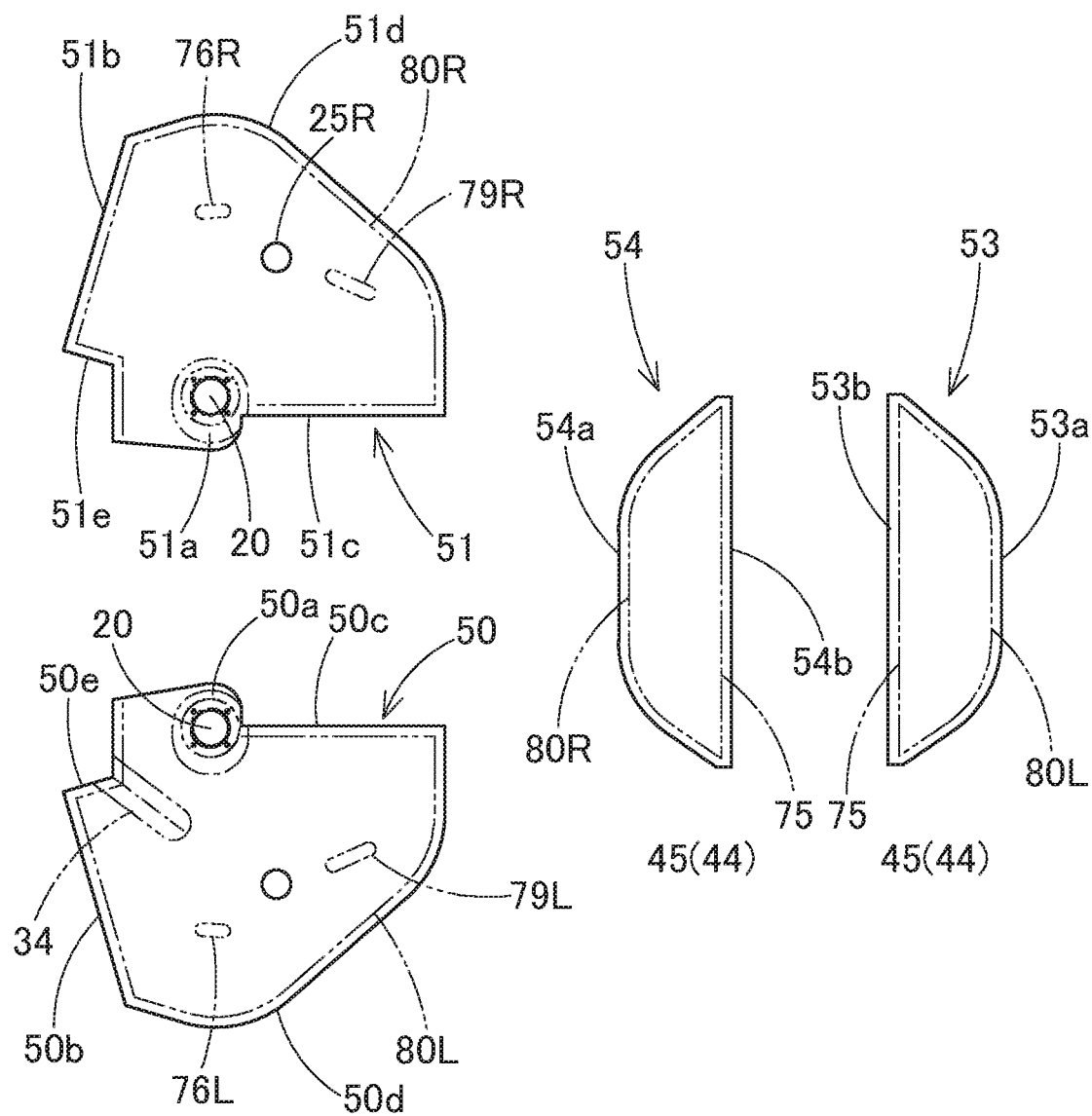
FIG. 8 depicts base cloths of a body of the airbag of FIG. 2 in plan views.

The bag body 16 is formed by sewing together circumferential edges of predetermined shaped base cloths. As shown in FIG. 8, the bag body 16 of the illustrated embodiment is composed of an outer left panel 50 and an outer right panel 51 which mainly form the circumferential wall 17, and an inner left panel 53 and an inner right panel 54 which mainly form the passenger side wall 28.

The outer left panel 50 and outer right panel 51 each constitute a left half area and a right half area of the circumferential wall 17. As can be seen in FIG. 8, the outer left panel 50 and outer right panel 51 have bilaterally symmetrical, generally sectorial contours. Each of the outer left panel 50 and outer right panel 51 has a protruding region 50a/51a for forming the peripheral area of the gas inlet port 20. The outer left panel 50 constitutes the left side wall 22, a left front half area of the upper side wall 18, a left area of the lower side wall 19 and a region to the left of the top 30a of the raised region 30L in the passenger side wall 28. The outer right panel 51 constitutes the right side wall 23, a right front half area of the upper side wall 18, a right area of the lower side wall 19 and a region to the right of the top 30a of the raised region 30R in the passenger side wall 28. The outer left panel 50 and outer right panel 51 are sewn together by the upper edges 50b and 51b and the lower edges 50c and 51c to form the circumferential wall 17 having a generally tubular contour.

The inner left panel 53 and inner right panel 54 constitute a region of the passenger side wall 28 disposed between the tops 30a of the raised regions 30L and 30R. Particularly, the inner left panel 53 and inner right panel 54 form an area extending across a rear end region of the upper side wall 18 in the circumferential wall 17 and the region of the passenger side wall 28 between the tops 30a of the raised regions 30L and 30R. The inner left panel 53 and inner right panel 54 are formed into bilaterally symmetrical, generally semicircular contours and each form a region from the leading end 29a of the recessed area 29 to the top 30a of the left raised region 30L and a region from the leading end 29a of the recessed area 29 to the top 30a of the right raised region 30R. Outer circumferential edges 53a and 54a of the inner left and right panels 53 and 54 are shaped generally to the curvatures of the rear edges 50d and 51d of the outer left panel 50 and outer right panel 51. Inner circumferential edges 53b and 54b of the inner left panel 53 and inner right panel 54 are sewn together.

In the illustrated embodiment, the outer left panel 50, the outer right panel 51, the inner left panel 53, the inner right panel 54, the base member for forming the redirecting cloth 40, the base cloths for forming the front-rear tether 35 and base cloths for forming the transverse tether 43 are made of flexible woven fabric of polyester yarn, polyamide yarn or the like.

Manufacturing of the airbag 15 is now described. Firstly, the inner left panel 53 and inner right panel 54 are overlaid one above the other with the circumferential edges mated, and the inner circumferential edges 53b and 54b of the panels 53 and 54 are sewn together with the rear end 37b of the rear section 37 of the front-rear tether 35 with sewing threads, thereby forming the seam 75. In the meantime, the outer left panel 50 and outer right panel 51 are overlaid one above the other with the circumferential edges mated, and are sewn together by the lower edges 50c and 51c with sewing threads. Then the outer left panel 50 and outer right panel 51 are opened such that the projecting regions 50a and 51a overlap each other. Subsequently, the base cloth of the front section 36 of the front-rear tether 35 and the base member of the redirecting cloth 40 are laid on the projecting regions 50a and 51a and sewn thereto by the periphery of the gas inlet port 20 with sewing threads. Then the gas inlet port 20 and the mounting holes 21 are punched out. Thereafter, the outer left panel 50 and outer right panel 51 are overlaid one above the other with the circumferential edges mated again, and are sewn together by the upper edges 50b and 51b with sewing threads. Subsequently, the outer left panel 50 and outer right panel 51 are opened such that the rear edges 50d and 51d are separated from each other, and the rear edge 50d of the outer left panel 50 and the outer circumferential edge 53a of the inner left panel 53 are sewn together with sewing threads to form the seam 80L, while the rear edge 51d of the outer right panel 51 and the outer circumferential edge 54a of the inner right panel 54 are sewn together with sewing threads to form the seam 80R.

Subsequently, outer ends 44a of the base cloths of the upper transverse tether 44 are each sewn to the outer left panel 50 and outer right panel 51 at positions proximate to and above the vent holes 25L and 25R with sewing threads, thereby forming seams 76L and 76R. Likewise, outer ends 46a of the base cloths of the lower transverse tether 46 are each sewn to the outer left panel 50 and outer right panel 51 at positions proximate to and below the vent holes 25L and 25R with sewing threads, thereby forming seams 79L and 79R.

Thereafter, the front section 36 of the front-rear tether 35 is doubled at the rear end 36c, and the rear end 36c as doubled is sewn to the front end 37a of the rear section 37, thus forming the front-rear tether 35. Then the bag body 16 is reversed inside out via an unsewn region at the front edges 50e and 51e of the outer left panel 50 and outer right panel 51, such that seam allowances may not appear outside. Each of the front edges 50e and 51e of the outer left panel 50 and outer right panel 51 is doubled (as shown in FIG. 2) and closed with sewing threads, thus forming the front seam 81. Then the edges 19c and 18c of the lower side wall 19 and upper side wall 18 are brought into contact with each other in the front end region of the outer left panel 50, and the tucked region, i.e. the turn-round portion 33L shown in FIG. 6A, is sewn up in a vicinity of the gas inlet port 20, thus forming the seam 34, i.e. the tuck 32. The airbag 15 is thus finished.

The folding process of the airbag 15 is now described. In the illustrated embodiment, the folding process of the airbag 15 includes a preparatory folding step in which a preparatorily folded airbag 85 is formed, a left-right contraction step in which the preparatorily folded airbag 85 is folded into a left-right contracted airbag 90, and a front-rear contraction step in which the left-right contracted airbag 90 is folded into an airbag package 93.

Figure 9A:
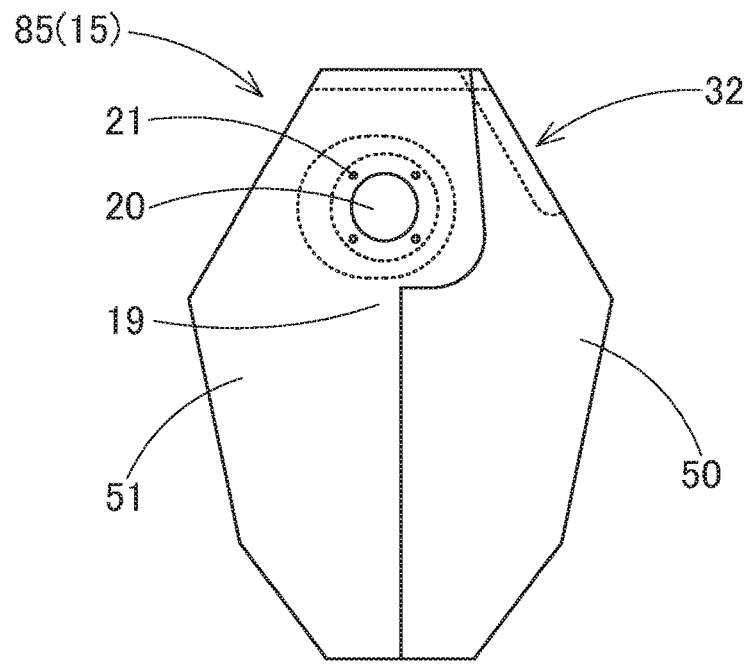
FIG. 9A is a plan view of the airbag of FIG. 2 as has been subjected to a preparatory folding.
Figure 9B:
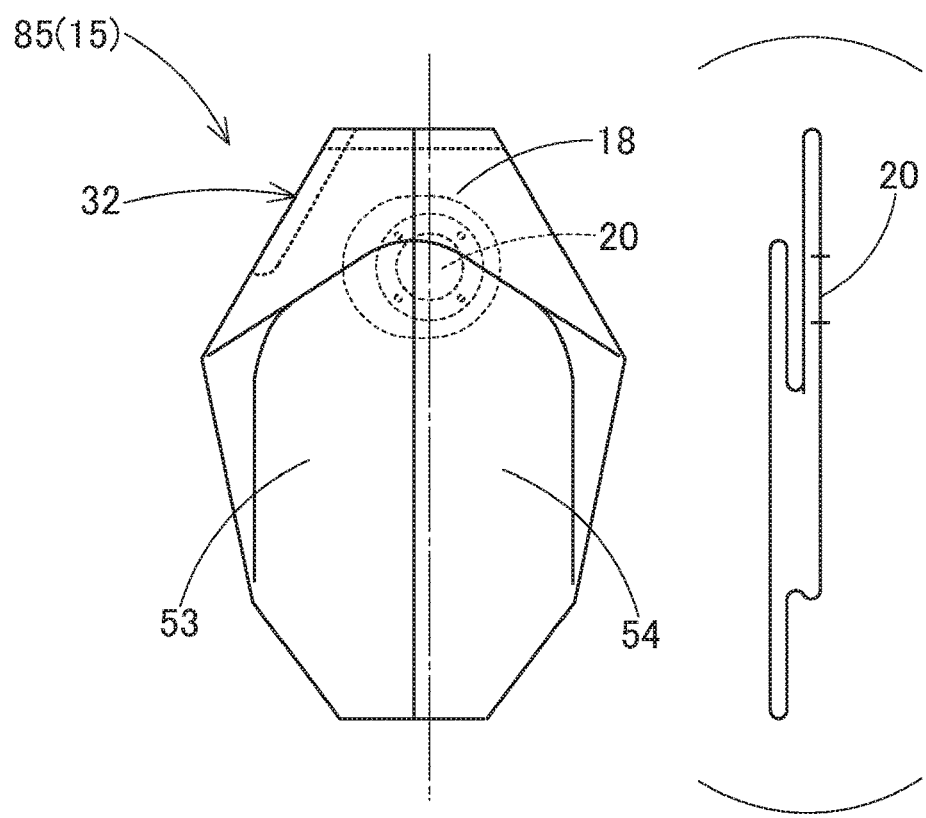
FIG. 9B is a back view of the airbag of FIG. 9A.

Before the airbag 15 is subjected to the preparatory folding, the retainer 9 is housed inside the airbag 15 such that the bolts 9a project out of the mounting holes 21. As shown in FIGS. 9A and 9B, in the preparatory folding step, the airbag 15 is folded on a fold extending along a left and right direction such that a central region in an up and down direction of the passenger side wall 28 is flattened and the passenger side wall 28 is brought close to the gas inlet port 20. Thus a preparatorily folded airbag 85, which has a generally bilaterally symmetrical, generally flat shape (flat plate shape), is formed.

Figure 10A:
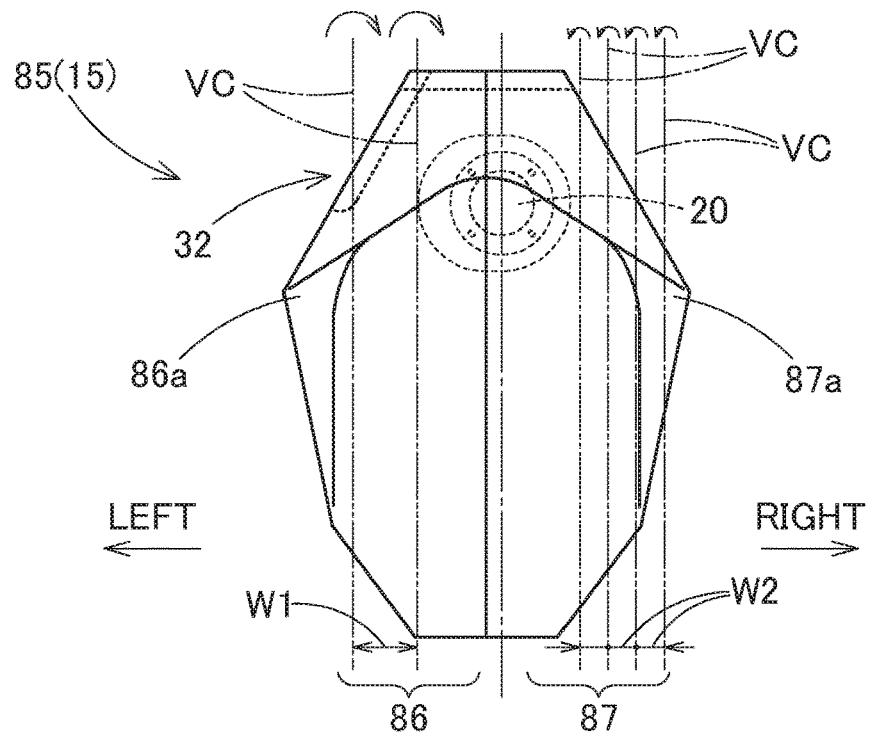
FIGS. 10A, 10B, 11A, 11B and 11C illustrate the folding process of the airbag of FIG. 2.
Figure 10B:
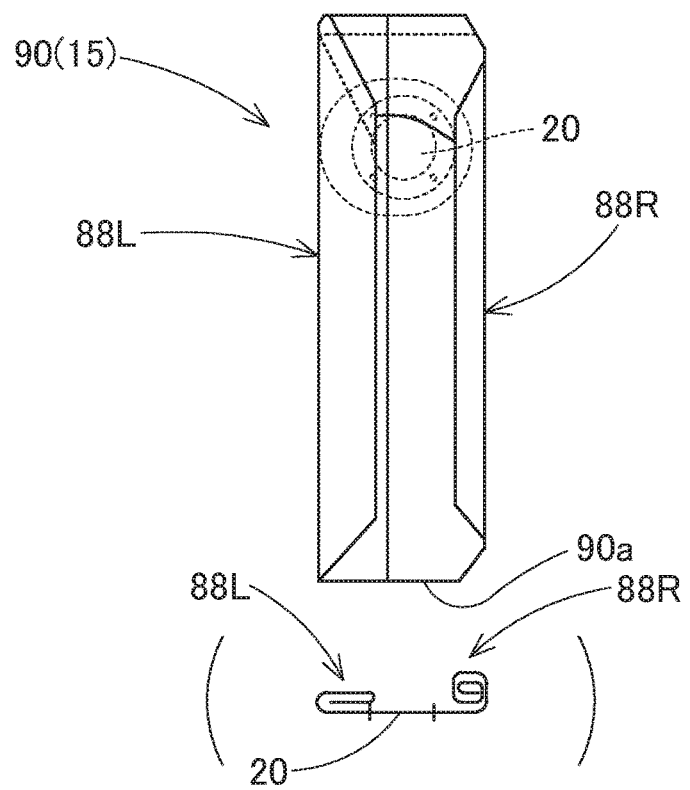

Then in the left-right contraction step, as shown in FIG. 10A, a left region 86 of the preparatorily folded airbag 85, which is disposed on the left side of the gas inlet port 20, and a right region 87, which is disposed on the right side of the gas inlet port 20, are each roll-folded towards the gas inlet port 20 from the leading ends 86a and 87a on a plurality of folds VC extending in a front and rear direction, thereby forming a left-right contracted airbag 90 which has roll-folded regions 88L and 88R, as shown in FIG. 10B. The roll-folded regions 88L and 88R are formed such that the gas inlet port 20 is disposed at the center in a width direction (i.e. in the left and right direction) of the left-right contracted airbag 90. The left-right contracted airbag 90 has such a reduced width in the left and right direction that can be housed in the case 12.

In the airbag 15 of the illustrated embodiment, the center of the gas inlet port 20 is displaced to the right side from the center in the left and right direction of the passenger side wall 28. To address this, the left region (or first region) 86 and the right region (second region) 87 which have been divided at the center of the gas inlet port 20 are subjected to different rolling fashions. As shown in FIG. 10A, specifically, the left region 86 having a long circumferential length in the left and right direction is roll-folded twice at a folding width W1, whereas the right region 87 having a shorter circumferential length in the left and right direction is roll-folded four times at a folding width W2 which is smaller than the folding width W1. The number of times of roll-folding described here is illustrative only, and may be changed as appropriate.

Figure 11A:
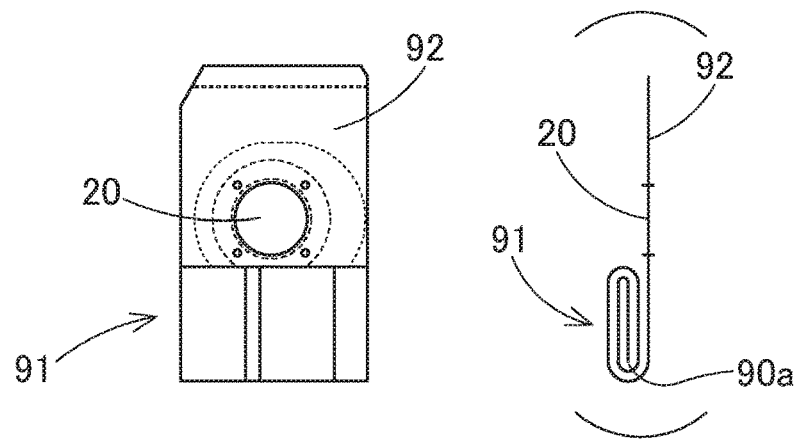
Figure 11B:
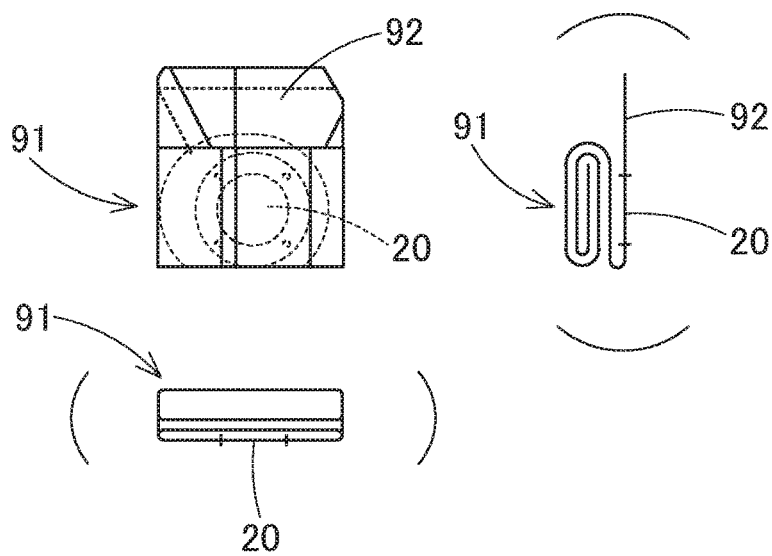
Figure 11C:
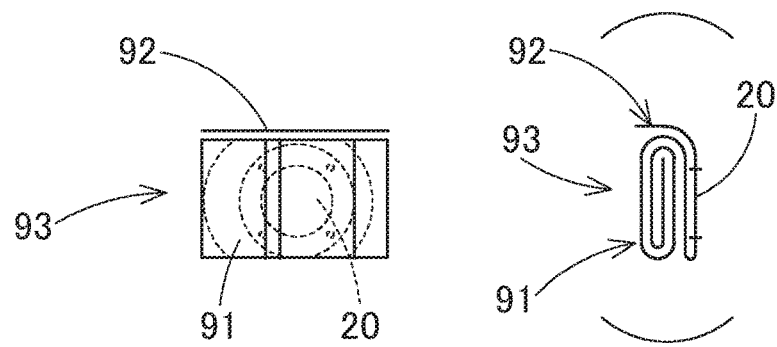

Subsequently, the front-rear contraction is conducted. As shown in FIG. 11A, the left-right contracted airbag 90 is roll-folded towards the gas inlet port 20 from the rear end 90a on a plurality of folds extending in a left and right direction, thereby forming a roll-folded region 91. The roll-folded region 91 is then turned over and placed on a side facing away from the gas inlet port 20, but above the gas inlet port 20, as shown in FIG. 11B, and a front region 92, which is disposed in front of the gas inlet port 20, is placed over the front side of the rolled region 91. Thus the front-rear contraction step as well as a whole folding process of the airbag 15 are completed and an airbag package 93, which has such a reduced width in a front and rear direction that can be housed in the case 12, is provided, as can be seen in FIG. 11C. In the airbag package 93, the roll-folded regions 88L and 88R formed in the left-right contraction step are displaced to the left and right from the gas inlet port 20.

Thereafter, a not-shown tearable wrapping sheet is mounted around the airbag package 93 for keeping the folded-up configuration. The airbag 15 (i.e. airbag package 93) is then placed on the bottom wall 12a of the case 12 such that the bolts 9a of the retainer 9 go through the bottom wall 12a. Then the inflator body 8a is inserted into the case 12 from below the bottom wall 12a such that the bolts 9a projecting downwardly from the bottom wall 12a go through the flange 8c of the inflator 8. When the bolts 9a are then fastened with nuts 10, the airbag 15 and the inflator 8 are mounted on the bottom wall 12a of the case 12.

Then the circumferential wall 12b of the case 12 is coupled to the joint wall 6b of the airbag cover 6 which has been already mounted on the vehicle, and the not-shown brackets of the case 12 are secured to the vehicle body structure. Thus the airbag device M for a front passenger seat is mounted on the vehicle.

After the airbag device M is mounted on the vehicle, when the airbag device M is actuated in the event of a frontal collision of the vehicle, the inflator 8 emits an inflation gas via the gas discharge ports 8b into the airbag 15, and the airbag 15 is inflated and pushes and opens the doors 6a and 6b of the airbag cover 6. Then the airbag 15 protrudes upward out of the case 12, via an opening formed by the opening of the doors 6a and 6b, and deploys rearward and completes deployment as can be seen in FIG. 1 (double-dotted lines) and FIG. 12.

Although the gas inlet port 20 is disposed off-center in the left and right direction, the airbag 15 of the illustrated embodiment is configured such that the left circumferential wall region 24L and the right circumferential wall region 24R, which are divided by the center line CL which runs through the center of the gas inlet port 20 and extends towards the upper side wall 18, have equal substantial circumferential lengths. Despite the off-center arrangement of the gas inlet port 20, this configuration makes the root region of the airbag in a vicinity of the gas inlet port 20 generally bilaterally symmetrical as viewed from the inflator 8 as inserted into the gas inlet port 20, thereby equalizing the amount of inflation gas delivered towards the left and the amount of inflation gas delivered towards the right from the inflator 8 in the event of an impact, as shown in FIG. 12. As a consequence, the configuration of the illustrated embodiment will prevent a torsion from occurring at the root region of the airbag and steady the deployment behavior of the airbag.

Specifically, in order that the left circumferential wall region 24L and the right circumferential wall region 24R have equal substantial circumferential lengths (which permits free expansion) in the front end region of the circumferential wall 20, the airbag 15 of the illustrated embodiment includes, in the left circumferential wall region 24L having a longer circumferential length, the tuck 32 which shortens it. This configuration is capable of changing the substantial circumferential length of the left circumferential wall region 24L easily by changing the position of the seam 34 of the tuck 32, without changing contours of the base cloths forming the circumferential wall 17.

In the airbag 15 of the illustrated embodiment, moreover, the tuck 32 is formed in the turn-round portion 33L that is formed by bringing edges of the lower side wall 19 and upper side wall 18 of the circumferential wall 17 into contact with each other. This way the tuck 32 is formed easily in a production process of the airbag 15.

In the folding process of the airbag 15, in particular in the left-right contraction step to reduce the width in the left and right direction of the airbag 15, the left region (i.e. first region) 86 of the airbag 15, which is disposed on the left side of the gas inlet port 20 and has a long circumferential length in the left and right direction, and the right region (i.e. second region) 87, which is disposed on the right side of the gas inlet port 20 and has a shorter circumferential length in the left and right direction than the left region 86, are both roll-folded. However, the degrees of ease of unfolding are differentiated between the left region 86 and right region 87 by making the folding width W2 of the right region 87 having the shorter circumferential length smaller than that of the left region 86 having the longer circumferential length as well as by increasing the number of time of roll-folding in the right region 87 more than in the left region 86. At airbag deployment, this method of folding will prevent the right region 87 having the smaller circumferential length (i.e. having a smaller expansion volume) from completing inflation prior to the left region 86 having the greater circumferential length (i.e. having a greater expansion volume), and help deploy the airbag 15 with a balance between the left and right regions.

What is claimed is:

1. A passenger seat airbag adapted to be mounted on a housing disposed in an instrument panel in front of a passenger seat of a vehicle for rearward deployment, the airbag being inflatable with an inflation gas into a contour like a generally square pyramid, the airbag comprising:

a passenger side wall that is deployed generally vertically at a rear end of the airbag for catching a passenger sitting in the passenger seat;

a circumferential wall that extends forward from the passenger side wall in a converging fashion, the circumferential wall including an upper side wall, a lower side wall, a left side wall, a right side wall, and a front end region that is adapted to be mounted on the housing;

a gas inlet port for introducing the inflation gas, the gas inlet port being disposed at a front end region of the lower side wall, at a position displaced either to the left or right from a center in a left and right direction of the passenger side wall; and a left circumferential wall region and a right circumferential wall region that are disposed in the front end region of the circumferential wall and divided by a center line which runs through a center of the gas inlet port and extends towards the upper side wall, wherein either one of the left circumferential wall region and the right circumferential wall region has a tuck that tucks and sews up a portion of the either one of the left circumferential wall region or the right circumferential wall region;

wherein, with respect to a substantial circumferential length from the upper side wall to the center of the gas inlet port which permits free expansion, the left circumferential wall region and the right circumferential wall region have equal substantial circumferential lengths;

wherein the tuck is formed so as to extend from a front end towards a rear end of the circumferential wall; and wherein a part of a rear end region of the tuck overlaps the gas inlet portion in a projection in a left and right direction.

2. The airbag of claim 1, further comprising a redirecting cloth that has a generally tubular contour open at left and right ends thereof and is disposed over the gas inlet port inside the airbag.

3. A passenger seat airbag adapted to be mounted on a housing disposed in an instrument panel in front of a passenger seat of a vehicle for rearward deployment, the airbag being inflatable with an inflation gas into a contour like a generally square pyramid, the airbag comprising:

a passenger side wall that is deployed generally vertically at a rear end of the airbag for catching a passenger sitting in the passenger seat;

a circumferential wall that extends forward from the passenger side wall in a converging fashion, the circumferential wall including an upper side wall, a lower side wall, a left side wall, a right side wall, and a front end region that is adapted to be mounted on the housing;

a gas inlet port for introducing the inflation gas, the gas inlet port being disposed at a front end region of the lower side wall, at a position displaced either to the left or right from a center in a left and right direction of the passenger side wall; and a left circumferential wall region and a right circumferential wall region that are disposed in the front end region of the circumferential wall and divided by a center line which runs through a center of the gas inlet port and extends towards the upper side wall, wherein either one of the left circumferential wall region and the right circumferential wall region has a tuck that tucks and sews up a portion of the either one of the left circumferential wall region or the right circumferential wall region;

wherein, with respect to a substantial circumferential length from the upper side wall to the center of the gas inlet port which permits free expansion, the left circumferential wall region and the right circumferential wall region have equal substantial circumferential lengths, wherein the tuck is formed at a turn-round portion of the upper side wall and lower side wall that is formed by bringing edges of the lower side wall and upper side wall into contact with each other.

4. The airbag of claim 3, further comprising a redirecting cloth that has a generally tubular contour open at left and right ends thereof and is disposed over the gas inlet port inside the airbag.

5. A method of folding a passenger seat airbag adapted to be mounted on a housing disposed in an instrument panel in front of a passenger seat of a vehicle for rearward deployment, the airbag being inflatable with an inflation gas into a contour like a generally square pyramid, the airbag comprising a passenger side wall that is deployed generally vertically at a rear end of the airbag for catching a passenger sitting in the passenger seat;

a circumferential wall that extends forward from the passenger side wall in a converging fashion, the circumferential wall including an upper side wall, a lower side wall, a left side wall, a right side wall, and a front end region that is adapted to be mounted on the housing;

a gas inlet port for introducing the inflation gas, the gas inlet port being disposed at a front end region of the lower side wall, at a position displaced either to the left or right from a center in a left and right direction of the passenger side wall; and a left circumferential wall region and a right circumferential wall region that are disposed in the front end region of the circumferential wall and divided by a center line which runs through a center of the gas inlet port and extends towards the upper side wall, wherein, with respect to a substantial circumferential length from the upper side wall to the center of the gas inlet port which permits free expansion, the left circumferential wall region and the right circumferential wall region have equal substantial circumferential lengths, the method comprising:

a preparatory folding step that unfolds and flattens the passenger side wall towards the gas inlet port and forms a preparatorily folded airbag;

a left-right contraction step that reduces a width in a left and right direction of the preparatorily folded airbag for storage in the housing, the left-right contraction step including folding a first region of the preparatorily folded airbag, which is disposed on one side of the gas inlet port in a left and right direction and has a longer circumferential length in the left and right direction, in such a folding manner that unfolds easily, and folding a second region of the preparatorily folded airbag, which is disposed on the other side of the gas inlet port in the left and right direction and has a shorter circumferential length in the left and right direction than the first region, in such a folding manner that unfolds less easily than that of the first region; and a front-rear contraction step that reduces a width in a front and rear direction of the preparatorily folded airbag for storage in the housing.

6. The method of folding the passenger seat airbag of claim 5, wherein:

the folding of the first region and the folding of the second region in the left-right contraction step are each composed of roll-folding;
a folding width of the roll-folding of the second region is smaller than that of the roll-folding of the first region; and
a number of times of the roll-folding of the second region is greater than that of the roll-folding of the first region.

* * * * *